United States Patent
Ward et al.

(10) Patent No.: US 6,644,782 B1
(45) Date of Patent: Nov. 11, 2003

(54) PRINTING SYSTEM AND PRINTING UNDER FIRING DATA RESOLUTION METHOD FOR PRINTING SYSTEM

(75) Inventors: Jefferson P Ward, Brush Prairie, WA (US); Marc A Yousey, Portland, OR (US); Jason Quintana, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/154,542

(22) Filed: May 23, 2002

(51) Int. Cl.[7] .................................................. B41J 2/01
(52) U.S. Cl. ...................................................... 347/40
(58) Field of Search ................................ 347/103, 120, 347/20, 123, 111, 159, 141, 155, 127, 128, 17, 154, 61; 399/271, 290, 292, 293, 294, 33, 67, 320

(56) References Cited

U.S. PATENT DOCUMENTS

| | | | |
|---|---|---|---|
| 5,638,183 A | 6/1997 | Hayashi et al. | |
| 6,290,328 B1 | 9/2001 | Yamada et al. | |
| 6,315,391 B1 | 11/2001 | Kanematsu | |
| 6,332,666 B1 | 12/2001 | Ikeda | |
| 6,364,446 B1 | 4/2002 | Ishikawa et al. | |

*Primary Examiner*—Raquel Yvette Gordon

(57) ABSTRACT

An inkjet printing system and print routine for use in conjunction with the printing system. The print routine prepares rendered source print data having a data resolution into sets of sweep data used to control a printhead of a printer. Each sweep data set contains firing data for an individual sweep of the inkjet printhead at a resolution that is less than the final printed image resolution.

43 Claims, 4 Drawing Sheets

PRINTING SYSTEM AND PRINTING UNDER FIRING DATA RESOLUTION METHOD FOR PRINTING SYSTEM

TECHNICAL FIELD

The present invention is generally related to the field of printers and, more particularly, is related to a system and method for printing under a firing data resolution.

BACKGROUND OF THE INVENTION

Inkjet printers are often used to print documents and images on a print medium. The print medium can include various types of media, such as paper, photographic print media, labels and so forth.

A conventional inkjet printer includes a movable inkjet printhead mounted on a carriage assembly. The carriage assembly moves the inkjet printhead laterally over the print medium in successive passes. The print medium is advanced in a direction perpendicular to the motion of the printhead by a drive assembly so that the printhead can progressively lay down ink droplets corresponding to the desired pattern being printed.

The printhead has an array of nozzles. Each nozzle generates ink droplets as the printhead moves over the print medium to produce the desired pattern on the print medium. Typically, each nozzle is formed by a nozzle chamber, a firing mechanism, and an orifice, with the firing mechanism being located within the nozzle chamber. Each nozzle is supplied with ink from an ink supply reservoir, noting that different nozzles can be supplied with ink from different ink reservoirs for printing multiple colors or for printing on different types of media.

A trend in inkjet printer technology has been to increase the number of ink drops that are targeted on the print medium and the resolution with which the pattern is printed in an attempt to improve the print quality. However, when increasing these variables, the capabilities of conventional inkjet printers in terms of data processing and/or data buffering capability and in terms of ink expression capability (e.g., nozzle firing ability) can be exceeded.

Accordingly, there exists a need in the art to increase the print quality without exceeding the capabilities of the inkjet printer.

SUMMARY OF THE INVENTION

According to one aspect of the invention, a method of preparing source print data corresponding to a pattern to be imaged on a print medium, the source data having a source data resolution of data points in a horizontal direction and a vertical direction. The method includes setting a final print resolution in the horizontal direction and the vertical direction; setting an actual nozzle firing resolution for each sweep of an inkjet printhead in the horizontal direction and the vertical direction, the actual firing resolution being lower than the final print resolution in the horizontal direction and the vertical direction than; expanding each source data point into one or more pixels of firing data to produce a firing data set having a firing data resolution the same as the final print resolution; and successively masking the firing data set at the actual firing resolution to generate a series of sweep data sets, each sweep data set containing firing data for an individual sweep of the inkjet printhead.

According to another aspect of the invention, a program embodied in computer readable medium to prepare source print data corresponding to a pattern to be imaged on a print medium, the source data having a source data resolution of data points in a horizontal direction and a vertical direction. The program includes code that sets a final print resolution in the horizontal direction and the vertical direction; code that sets an actual nozzle firing resolution for each sweep of an inkjet printhead in the horizontal direction and the vertical direction, the actual firing resolution being lower than the final print resolution in the horizontal direction and the vertical direction; code that expands each source data point into one or more pixels of firing data to produce a firing data set having a firing data resolution the same as the final print resolution; and code that successively masks the firing data set at the actual firing resolution to generate a series of sweep data sets, each sweep data set containing firing data for an individual sweep of the inkjet printhead.

According to yet another aspect of the invention, a printer system that prepares source print data corresponding to a pattern to be imaged on a print medium, the source data having a source data resolution of data points in a horizontal direction and a vertical direction. The printer system includes means for setting a final print resolution in the horizontal direction and the vertical direction; means for setting an actual nozzle firing resolution for each sweep of an inkjet printhead in the horizontal direction and the vertical direction, the actual firing resolution being lower than the final print resolution in the horizontal direction and the vertical direction; means for expanding each source data point into one or more pixels of firing data to produce a firing data set having a firing data resolution the same as the final print resolution; and means for successively masking the firing data set at the actual firing resolution to generate a series of sweep data sets, each sweep data set containing firing data for an individual sweep of the inkjet printhead.

According to still another aspect of the invention, an inkjet printer system. The printer system includes a printhead for imaging a pattern on a print medium during successive sweeps over the print medium using a plurality of inkjet nozzles; and a control assembly for controlling the firing of the nozzles of the printhead, the firing of the nozzles for each sweep of the printhead controlled in accordance with a corresponding sweep data set, each sweep data set containing pixelized firing data having an actual firing resolution that is less than a final print resolution of the pattern, each sweep data set generated by expanding each of a plurality of data points from a set of source data corresponding to the pattern into one or more firing data pixels to produce a firing data set and masking the firing data set at the actual firing resolution.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

Although certain features may be shown in somewhat schematic form, the invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
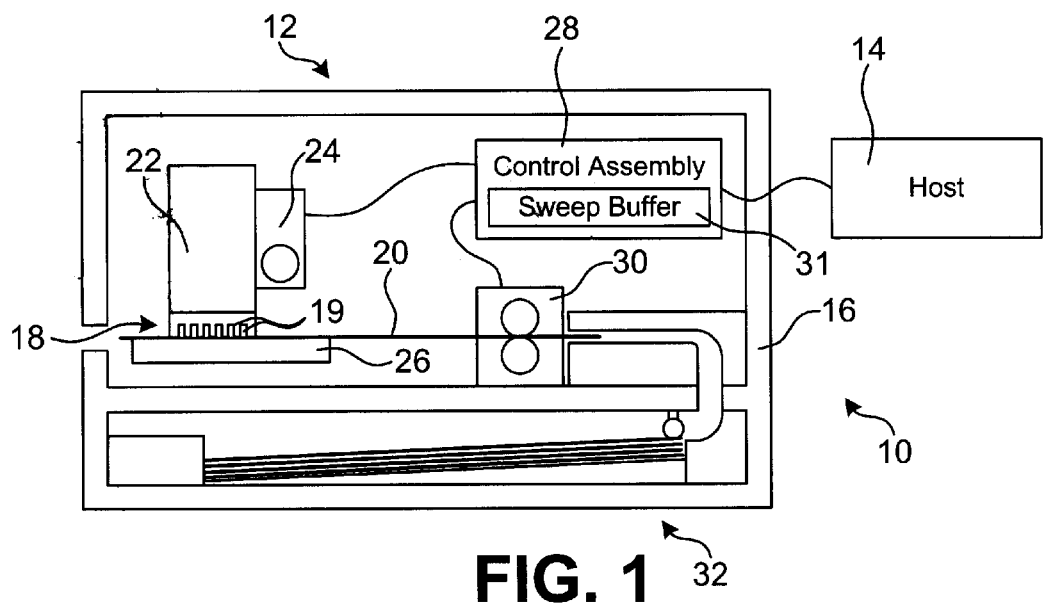
FIG. 1 is a block diagram of a printer system according to the present invention.

Referring initially to FIG. 1, a printer system 10 is illustrated. The illustrated printer system 10 includes an inkjet printer 12 coupled to receive a print job from a host 14. The print job can be in a format compatible with the printer, such as a page description language (PDL) file or a page control language (PCL) file.

As one skilled in the art will appreciate, the illustrated inkjet printer 12 is exemplary and the present invention applies to inkjet printers having different configurations and other types of printers that print by making successive passes over a print medium such as, for example, a thermal printer, a plotter, etc.

The host 14 can be a general computing device, such as a desktop or portable computer, a workstation, a personal digital assistant (PDA), a network server, or the like. The printer 12 can be connected directly to the host 14 or coupled to the host 14 via a network (if applicable, the network can include a print server). Alternatively, the host 14 can be a dedicated device such as, for example, a camera, an electronic photograph processing machine or other apparatus.

As will be described in greater detail below, the host 14 is adapted to execute a print under firing data resolution routine, also referred to herein simply as a print routine 66. In one embodiment, the print routine can be executed independently of other executable routines. Alternatively, and as described by example herein, the print routine can be executed as part of a printer driver. In another embodiment, the print routine can be executed by a device other than the host 14, such as by the printer 12, by a networked device (e.g., a print server), and so forth.

The printer 12 includes a housing 16 that supports various subcomponents of the printer 12. The printer 12 includes an inkjet printhead 18 used to print, or image, a desired pattern on a print medium 20 as dictated by the print job. For this purpose, the printhead 18 can be mounted on a print cartridge 22 having one or more ink supply reservoirs. The print cartridge 22 can be removably supported by a print cartridge carriage 24 that moves the printhead 18 laterally over the print medium 20 as is known in the art. A platen 26, having a paper supporting surface, can be disposed under the print medium 20 opposite the printhead 18.

In one embodiment, the printhead 18 has an array of nozzles 19 as is known in the art. The nozzles 19 can be arranged, for example, in a "staggered" matrix of rows and columns and can be grouped into pens as is known in the art. The nozzles 19 can be controlled to generate ink droplets as the printhead 18 moves over the print medium 20 to produce a desired image on the print medium 20. Each nozzle 19 can be formed from a nozzle chamber, a firing mechanism and an orifice, with the firing mechanism being located within the nozzle chamber. As one skilled in the art will appreciate, other types of printheads, pens, nozzle assemblies, heater elements and the like can be used in place of the printhead 18 depending on the specific printer.

As indicated, the printhead 18 is moved laterally over the print medium in successive passes, or sweeps. In addition, the print medium 20 can be advanced, usually between sweeps of the printhead 18, in a direction perpendicular to the motion of the printhead 18 so that the printhead 18 can progressively lays down segments (or portions) of the desired pattern being printed.

Movement of the printhead 18 and deposition of ink from the printhead 18 onto the print medium 20 is controlled by a control assembly 28. The control assembly 28 also controls a drive assembly 30 for advancing the print medium 20 through the printer 12.

The control assembly 28 can include a data buffer 31 (also referred to herein as a sweep buffer 31) in the form of a memory component (e.g., a dynamic random access memory (DRAM)) to temporarily store data relating to the print job. For each printhead 18 sweep, the sweep buffer 31 stores a sweep data set. The sweep data set contains data used in the control of the printhead 18.

As one skilled in the art will appreciate, the printer 12 can be provided with additional subassemblies for assisting in printing on the print medium 20 and can include, for example, rollers, motors, mechanical actuators, power supplies, a communications interface for communicating with the host 14, and so forth. In addition, the control assembly 28 can execute various logic routines to communicate with the host, print received print jobs, and carry out other printer functions. These logic routines can take the form of computer code, such as firmware.

In the illustrated example, sheets of print medium 20 are supplied from a supply tray 32. Components can be provided to selectively advance individual sheets of print medium 20 from the supply tray 32 into a position to be imaged by the printhead 18. Other components can be provided to eject the imaged print medium from the printer 12. In an alternative arrangement, the print medium 20 can be a roll of stock material that forms a continuous web of printable material. The sheets or web of printable material can be, for example, paper, photographic print media, labels or the like.

As used herein, the terms pattern, page and image are used interchangeably and in their broadest sense to define that which is printed or imaged on the print medium 20 and can include, for example, text and/or graphics, an image, a drawing, a photograph, and the like.

Figure 2:
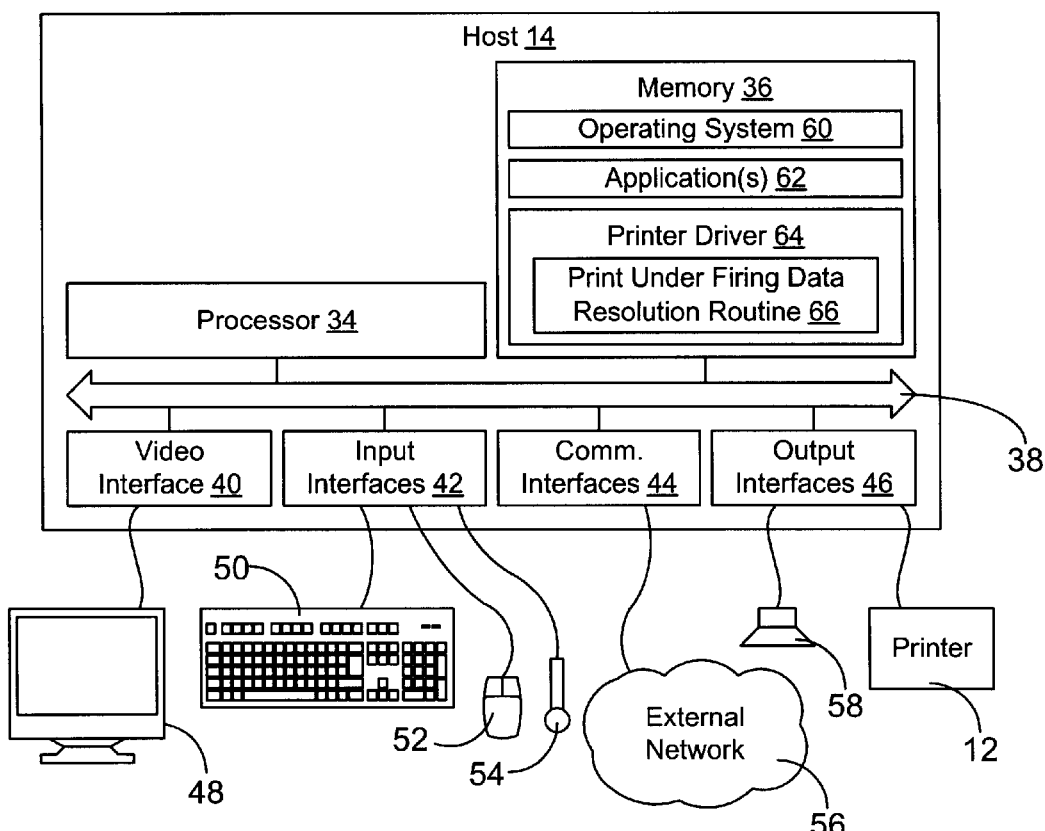
FIG. 2 is a block diagram of a host component of the printer system of FIG. 1, the host configured to execute a print under firing data resolution routine according to the present invention.

With additional reference to FIG. 2, an example embodiment of the host 14 is illustrated. The host 14 can be a general purpose computing device, such as a network server, a desktop computer, a work-station, a portable computer (also referred to as a laptop computer), a personal digital assistant (PDA), and the like. Accordingly, the host can include a processor (or processors) 34 for executing instructions, usually in the form of computer code, to carry out a specified logic routine.

The host 14 can also have a memory (or multiple memory components) 36 for storing data, software, logic routine instructions, computer programs, files, operating system instructions, and the like. The memory 36 can comprise several devices and includes, for example, volatile and non-volatile memory components (e.g., random access memory (RAM), read-only memory (ROM), hard disks, floppy disks, compact disks (including, but not limited to, CD-ROM, DVD-ROM, CD-RW and DVD-RW), tapes, and/or other memory components, plus associated drives and players for these memory types).

The processor 34 and the memory 36 can be coupled via a local interface 38, such as a data bus with accompanying control bus, or a network between the processor(s) 34 and memory(ies) 36. In addition, the host 14 can have a number of external interfaces, each coupled to the local interface 38. The external interfaces can include, for example, a video interface 40, input interfaces 42, one or more communications interfaces 44, and output interfaces 46.

A display 48 can be coupled to the local interface 38 via the video interface 40. Input devices (e.g., a keyboard 50, a mouse 52, a microphone 54, etc.) can be coupled to the local interface 38 via the input interfaces 42.

The communications interfaces 44 can include, for example, a modem, a network card and/or other type of transceiver. In the illustrated embodiment, the communications interface 44 is coupled to an external network 56 to enable the host 14 to send and receive data signals, voice signals, video signals, and the like via the external network 56, as is well known in the art. For example, the printer 12 can be coupled to the host 14 via the external network. The external network 56 can include one or more networks, such as the Internet, a wide area network (WAN), a local area network (LAN), a direct data link, a telephone network or other similar network or communications link, including wired and wireless network arrangements.

Various output devices (including, for example, the printer 12, a speaker 58, etc.) can be coupled to the host 14 via the output interfaces 46. Alternatively, the output devices can be coupled to the host via the external network 56.

The memory 36 can store an operating system 60 that is executed by the processor 34 to control the allocation and usage of resources in the host 14. Specifically, the operating system 60 controls the allocation and usage of the memory 36, the processing time of the processor 34 that is dedicated to various applications 62 being executed by the processor 34 and to the peripheral devices, as well as performing other functionality. In this manner, the operating system 60 serves as the foundation on which the applications 62 depend, as is generally known by those with ordinary skill in the art. The applications 62 can include a variety of "programs" that carry out a wide range of functionality, such as, a word processing program, a spreadsheet program, a personal organizer program, a graphical arts program, an image or photograph manipulation program, and so on.

While working with one or more of the applications 62, a user of the host 14 may desire to print at least a portion of a file (e.g., a text file, a graphics file, a photograph, etc.). In order to print the desired information, the user will typically invoke commands within the application 62 and/or operating system 60 that call a printing subroutine of the application 62 and/or operating system 60.

To assist the application 62 and/or operating system 60 in placing the desired information into a format compatible with the printer 12, the printing subroutine can call a printer driver 64. As one skilled in the art will appreciate, the printer driver 64 converts the application's data into print data usable by the printer 12 to render the appropriate image on the print media 20.

To improve print quality, it may be desirous to increase the number of ink droplets targeted are placed on the print medium 20. It may also be desirous to increase the print resolution with which the ink droplets are targeted on the print medium 20. As used herein, the term "print resolution" or "final print resolution" refers to the number of pixels (or "dots") at which ink drops are placed per unit distance after the pattern has been fully printed on the print medium 20. However, when increasing the print resolution, the capabilities of conventional inkjet printers in terms of data processing and/or data buffering capability and in terms of ink expression (e.g., nozzle firing ability) capability should be considered.

In this regard, the printer driver 64 can include a print under firing data resolution routine 66 to assist in preparing the print data for the printer 12. As will become more apparent below, the print under firing data resolution routine 66 can be used to systematically deliver nozzle firing data in sweep sets to the printer 12. Each sweep data set includes a portion of an overall firing data set used by the control assembly 28 to control the printhead 18 during a sweep of the printhead 18. Also, each sweep data set is sized to be to be within a data storage capacity of the sweep buffer 31.

In addition, the print under firing data resolution routine 66 can be used in conjunction with control routines of the printer's control assembly 28 to generate a printed image that has a higher final print resolution than a resolution of a rendered source data set (i.e., source data resolution) corresponding to the image. The higher print resolution is a result of an aggregation of successive printing sweeps over on the print medium where the printhead 18 is controlled to have an actual nozzle firing resolution that is less than the final print resolution.

As will become more apparent below, there are at least four resolutions of concern for the present invention. These resolutions include a resolution of the rendered source print data set (or the source data resolusion), the resolution of the firing data set derived from the source data (or the firing data resolution), the resolution of the ink droplets expressed during a sweep of the printhead 18 (or the actual firing resolution), and the resolution of the ink droplets comprising the final imaged print job on the print medium 20 (or the print resolution). In the embodiment described herein, the firing data resolution is the same as the print resolution.

The rendered source print data contains information regarding data points corresponding to the pattern to be printed. Each source data point (also referred to in the art as pixels and/or dots) may specify more than one ink droplet. Accordingly, the source data resolution can be expressed in terms of a number of data points per inch in a horizontal direction and in a vertical direction. The firing data resolution, the actual firing resolution and the print resolution can be expressed in terms of a number of ink drop locations (also referred to as dots and/or pixels) per inch in the horizontal direction and in the vertical direction (one ink drop location may have more than one ink drop associated therewith. Although, the data resolution is expressed in terms of data points per inch (DPPI) and the print resolution, the firing data resolution and the actual firing resolution are expressed in terms of dots per inch (DPI), all of these resolutions can be directly compared against one another. Therefore, a print resolution of 2,400 dpi by 1,200 dpi is higher than a source data resolution of 1,200 DPPI by 1,200 DPPI, which is higher than an actual firing resolution of 600 dpi by 300 dpi.

In one embodiment, each sweep data set contains data relating to pixels located at the intersection of specified rasters (or rows) and specified columns. Successive sweep data sets are transmitted to the sweep buffer 31 and the corresponding pixels are imaged on the print medium 20 until all ink drops specified by the source data are imaged. In other words, for each sweep of the printhead 18, sweep data (containing information regarding which pixels of which rows should be imaged with which color ink) is transmitted to the sweep buffer 31. Accordingly, the sweep data can be nozzle firing data used to control the firing of selected nozzles 19 of the printhead 18.

As will become more apparent from the following discussion, the sweep data for any particular sweep of the printhead 18 does not contain all of the data associated with the row or rows to be imaged during the associated sweep of the printhead 18. In addition, the sweep data for any particular sweep contains data relating to a firing resolution that is less than the final print resolution of the image to be printed. In this regard, some of the sweep data conventionally transmitted to the sweep buffer 31 for a particular sweep of the printhead in a conventional inkjet printer is not transmitted under the routine described herein (conventional inkjet printers being configured to fire with a firing resolution that is equal to or greater than the print resolution). Rather, some of the sweep data normally transmitted to the sweep buffer 31 for a particular sweep of the printhead in a conventional inkjet printer is skipped or, more specifically, deferred until a subsequent sweep(s) or fired on a previous sweep(s).

Figure 3:
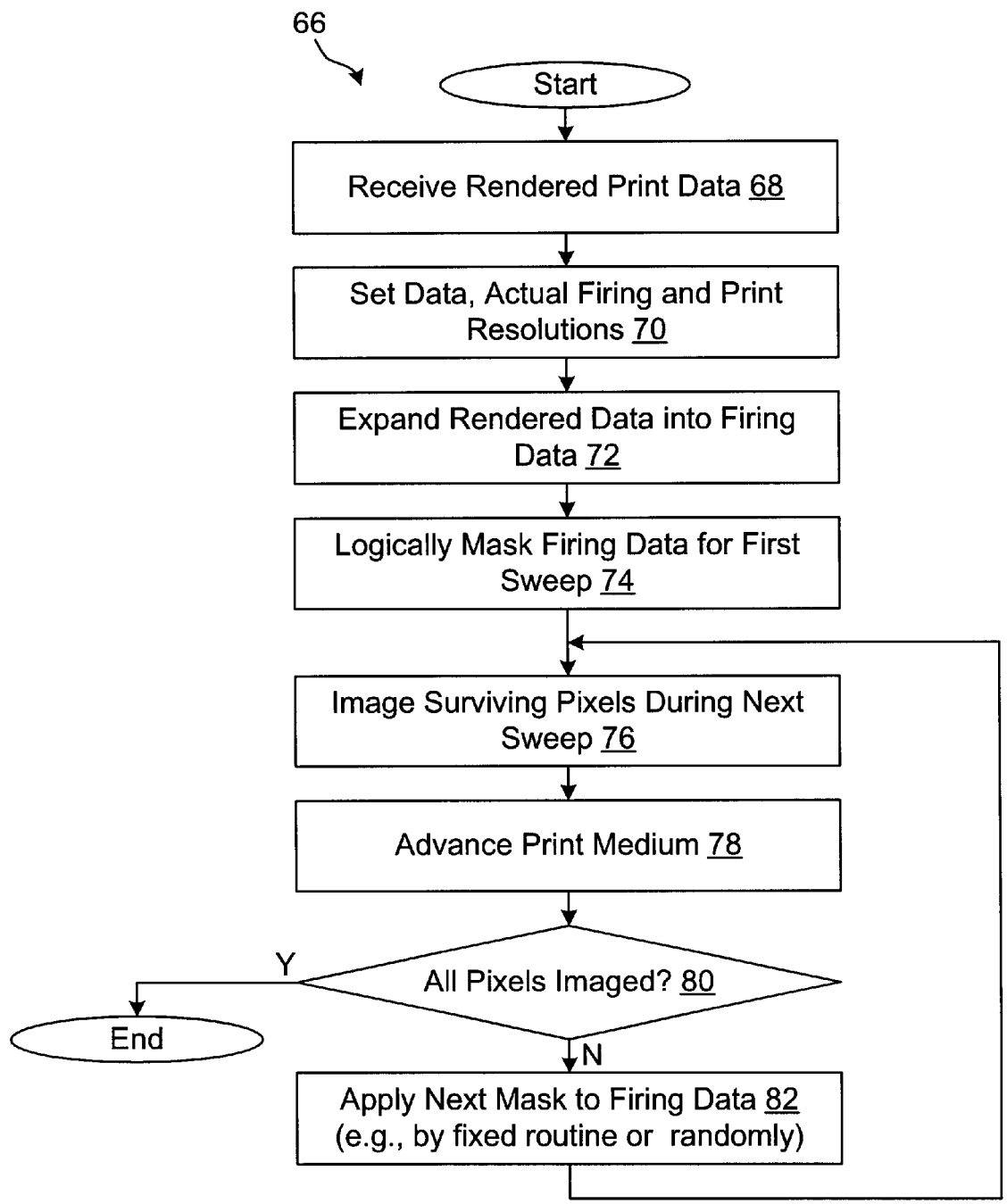
FIG. 3 is an exemplary flow chart of the print under firing data resolution routine executed by the host of FIG. 2.

With additional reference to FIG. 3, shown is an exemplary flow chart of the print under data resolution routine 66 according to the present invention. Alternatively, the flow chart of FIG. 3 can be thought of as depicting steps in a method implemented in the host 14. As one skilled in the art will appreciate, the print under data resolution routine 66 can alternatively be implemented in the printer 12 or another computing device with similar results.

It is believed that the certain aspects of the present invention will be best described by way of example. Accordingly, the following description will be made with respect to a specific example implementation of the present invention and a specific set of rendered print data. However, one skilled in the art will appreciate that the concepts described herein can be applied to any printer and/or print job where an actual firing resolution is set to have a value that is less than or equal to a final print resolution (and, in the embodiment described herein, an actual firing resolution that is less than or equal to a firing data resolution) and where the final print resolution and/or the firing data resolution are greater than or equal to a source data resolution. It is noted that the actual firing resolution can be less than the source data resolution, but could also be higher than or equal to the actual firing resolution.

In the example, a rendered set of print data (i.e., the source data) has a source data resolution of 1,200 DPPI in a vertical direction and 1,200 DPPI in a horizontal direction. For the rendered data, each data point can include multi-level (or multi-bit) data. The levels of data can include a color indicator, such as no color (represented in the figures attached hereto as a dash (or "–") and referred to herein as "white space"), black (represented herein by a "K"), cyan (represented herein by a "C"), magenta (represented herein by an "M"), yellow (represented herein by a "Y") and so forth. The levels of data can also include an ink drop number indicator, such as no ink drops corresponding to white space (or no color) at that data point (represented in FIG. 4 by a dash, or "–"), one drop of the indicated color (represented in FIG. 4 by a plain font version of the letter corresponding to the desired color), two drops of the indicated color (represented in FIG. 4 by a bold, italicized version of the letter corresponding to the desired color), three drops of the indicated color (represented in FIG. 4 by a white text version of the letter corresponding to the desired color against a dark background) and so forth.

Figure 4:
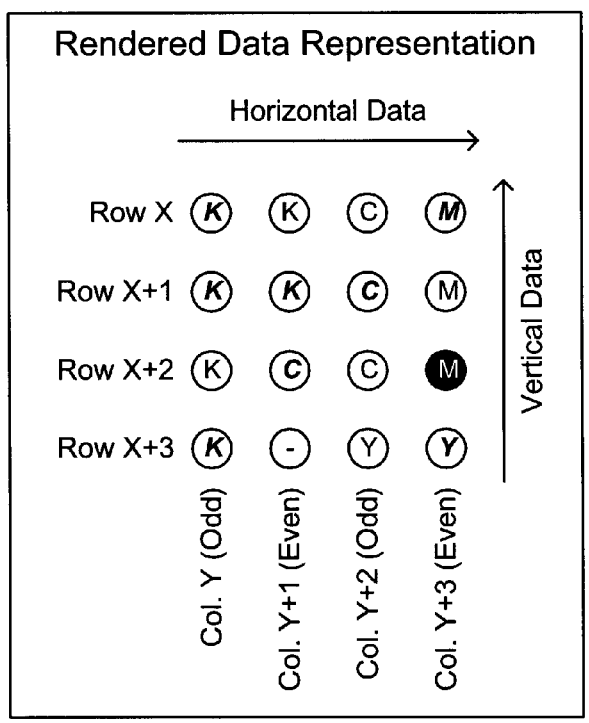
FIG. 4 is a partial representation of an exemplary source data set to be printed by the printer system of FIG. 1.

With additional reference to FIG. 4, an example four data point by four data point portion of a rendered source data set is illustrated. At 1,200 DPPI by 1,200 DPPI, the representation of FIG. 4 would correspond to about a $\frac{1}{300}$ of an inch by a $\frac{1}{300}$ of an inch portion of the corresponding image. The data points are logically arranged in horizontal rows (also referred to as rasters where one row corresponds to one raster) and columns. The illustrated rows are labeled for the purposes of the discussion herein as row X, row X+1, row X+2 and row X+3. Similarly, the columns are labeled col. Y, col. Y+1, col. Y+2 and col. Y+3. Every other column is also identified as an odd column and an even column is positioned between each adjacent odd column.

The source data is processed by the print under firing data resolution routine 66 to generate a series of sweep data sets that are sequentially sent to the sweep buffer 31. Each sweep data set contains the information needed for the control assembly 28 to control the printhead during one sweep, or pass, of the printhead 18.

In printing under the firing data resolution, each sweep data set is configured to contain firing data at less than the final print resolution (and, in the embodiment described herein, less than the firing data resolution) in at least one of the vertical or the horizontal directions. In the example, the final print resolution and the firing data resolution are each 2,400 dpi by 1,200 dpi and each sweep is configured to express ink droplets with ink drop centroids having a resolution of about 600 dpi in the horizontal direction and about 300 dpi in the vertical direction. It is noted that the printhead may actually be capable of expressing ink droplets at a higher resolution in one or both of the vertical and horizontal directions. For purposes of the example herein, the inkjet printhead 18 can have a nozzle density of 300 nozzles per inch and a pen height of about $\frac{1}{16}$ of an inch. In addition, the nozzles can be implemented with a nozzle stagger.

In the example, the final print resolution of ink droplets on the print medium is selected to be 2,400 dpi in the horizontal direction and 1,200 dpi in the vertical direction. At a firing resolution of 600 dpi horizontal and 300 dpi vertical, printing the example four data point by four data point portion of the rendered data can take a minimum of about sixteen sweeps. If the image portion has a relatively large amount of white space, less than sixteen sweeps may be needed. Similarly, if the image portion contains pixels that specify that three or more ink droplets should be expressed, additional sweeps may be needed.

Figure 5:
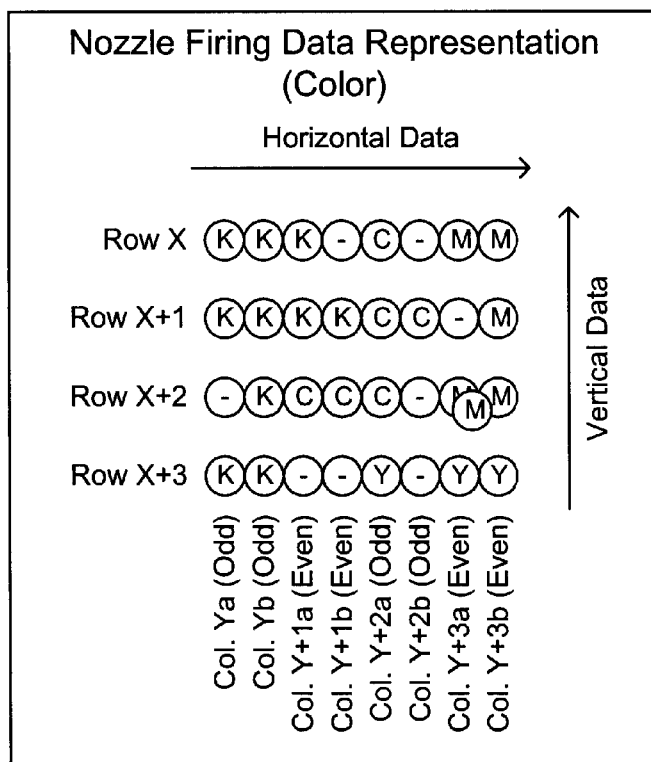
FIG. 5 is a color map representation of the exemplary source data of FIG. 4 following processing by the print under firing data resolution routine.

The portion of exemplary print data illustrated in FIG. 4 is re-illustrated in FIG. 5 after the source data has been processed by the print routine 66 to be in the form of firing data. It is noted that the data illustrated in FIG. 5 relates to the color of the ink drops corresponding to the source data and the ink drops' approximate location relative to one another, but not the order in which the ink drops should be imaged onto the print medium 20.

Figure 6:
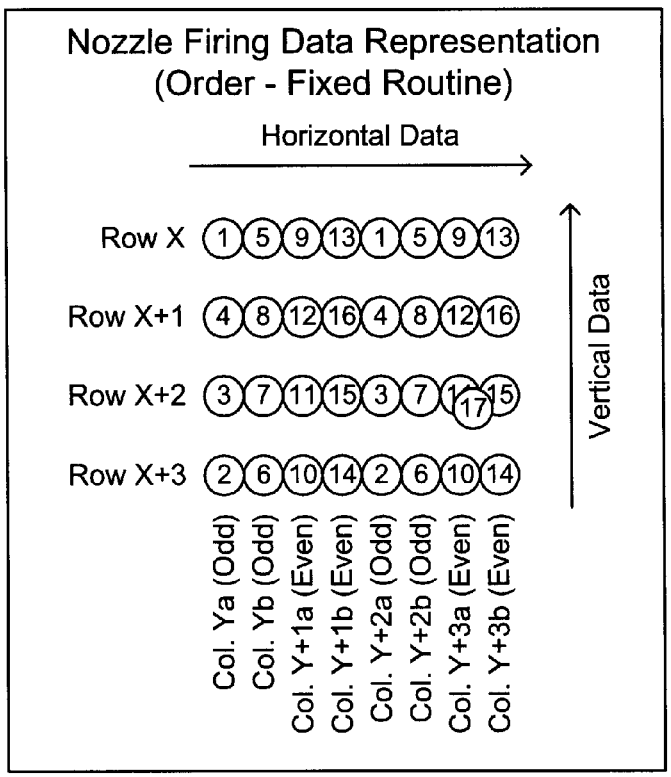
FIG. 6 is a fixed nozzle firing order representation of the exemplary source data of FIG. 4 following processing by a first embodiment of the print under firing data resolution routine.
Figure 7:
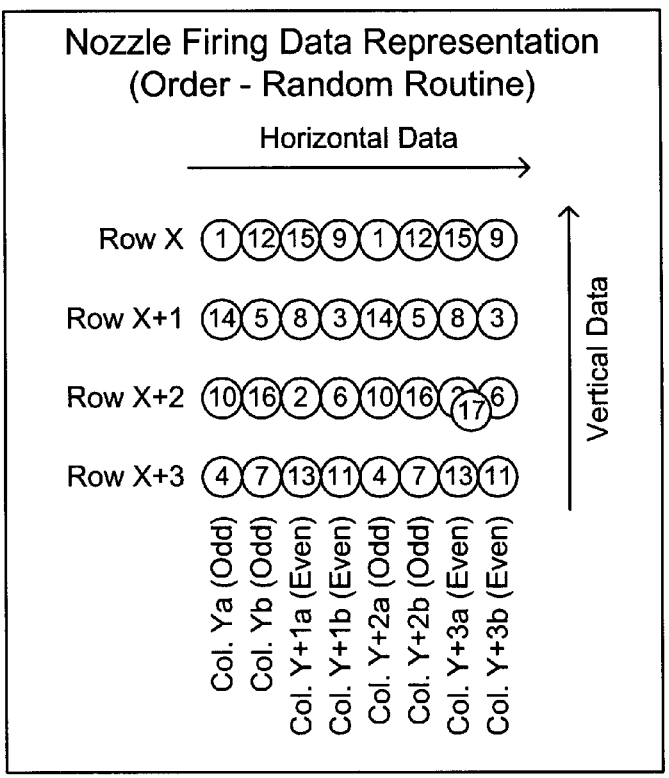
FIG. 7 is a random nozzle firing order representation of the exemplary source data of FIG. 4 following processing by a second embodiment of the print under firing data resolution routine.

An example of the printing order (or firing order) of the firing data of FIG. 5 is illustrated in FIG. 6. It is noted that the firing order is directly related to the set of sweep data to which each ink droplet belongs. The example of FIG. 6 illustrates the firing order when the ink droplets are to be expressed according to a fixed pattern. FIG. 7 illustrates a similar example ink droplet printing order according to a random printing pattern.

Referring back now to FIG. 3, the print routine 66 starts in box 68 where rendered source data is received. In one example, the printer driver 64 converts application data into rendered source data as is known in the art. The rendered source data is then passed to the print routine 66 for processing. In instances where the print routine 66 is executed by the host 14, the rendered source data can simply be made available to the print routine 66. In instances where the print routine 66 is executed by a device other than the host 14 (e.g., the printer 12 or a printer server), the rendered source data can be transmitted to the appropriate device via the appropriate interface (e.g., the communications interface 44 or the output interface 46).

As indicated, FIG. 4 illustrates an example four data point by four data point portion of a rendered source data set. In the example, the resolution of the exemplary source data (i.e., source data resolution) is 1,200 DPPI by 1,200 DPPI. The rendered source data is typically comprised of binary words that indicate data point location, color and ink drop number. Location, color and ink drop number are illustrated graphically in FIG. 4. Table 1 sets forth this graphically represented source data in table format.

TABLE 1

| | Col. Y (Odd Pixels) | Col. Y + 1 (Even Pixels) | Col. Y + 2 (Odd Pixels) | Col. Y + 2 (Even Pixels) |
|---|---|---|---|---|
| Row X | Black - two ink drops | Black - one ink drop | Cyan - one ink drop | Magenta - two ink drops |
| Row X + 1 | Black - two ink drops | Black - two ink drops | Cyan - two ink drops | Magenta - one ink drops |
| Row X + 2 | Black - one ink drops | Cyan - two ink drops | Cyan - one ink drop | Magenta - three ink drops |
| Row X + 3 | Black - two ink drops | White space - no ink drops | Yellow - one ink drop | Yellow - two ink drops |

The print routine 66 continues in box 70 where the firing data resolution, the actual firing resolution and the final print resolution are set. In the illustrated example, the actual firing resolution is set to 600 dpi in the horizontal direction and 300 dpi in the vertical direction. Accordingly, for each sweep of the printhead 18 over the print medium 20, ink droplets will be expressed from the nozzles 19 at a spacing of one ink drop approximately every 1/600 of an inch in the horizontal direction and at approximately every 1/300 of an inch in the vertical direction. In the illustrated example, the final print resolution and the firing data resolution are set to 2,400 dpi in the horizontal direction and 1,200 dpi in the vertical direction.

Thereafter, in box 72 the source data is expanded into a firing data set. The firing data includes relative location of each ink drop, the color of each ink drop and the sweep set to which each ink drop belongs. Using the example source data from FIG. 4 and table 1, FIG. 5 illustrates example relative location and color data corresponding to each data point of source data. It is noted that the illustrated firing data represents theoretical ink drop centers laid out in a uniform grid arrangement. However, expressed ink drops may have overlap among the ink drops and/or non-uniform spacing between ink drops. This is a result of mechanical tolerances of the printer, ink flow, intentional shifting of ink drop deposits, etc.

FIG. 6 illustrates example temporal information regarding when each ink drop is to be printed during the imaging of the print medium 20 according to a fixed routine embodiment of the print routine 66. It is noted that the temporal order of ink drop deposition is directly related to the sweep sets. Accordingly, the numbers illustrated in FIG. 6 indicate the sweep set to which the ink drop in the corresponding location belongs. For example, the use of the number one (1) indicates the ink drops that are deposited in a first sweep of the printhead 18. It is 20 noted that the illustrated firing data represents only a portion of the pattern being printed and earlier sweeps of the printhead 18 may have been made before the pens of the printhead 18 are physically located with respect to the print medium 20 to image the illustrated firing data. The number two (2) indicates the second sweep of the printhead 18, the number three (3) indicates the third sweep, and so forth.

FIG. 7 illustrates example temporal information regarding when each ink drop is to be printed during the imaging on the print medium 20 according to a random routine embodiment of the print routine 66. As with the numbers illustrated in FIG. 6, the numbers illustrated in FIG. 7 correspond to the sweep set to which the corresponding ink drops belong. Accordingly, for a complete map of the source 30 data to the firing data, one of the pairings of FIGS. 5 and 6 or FIGS. 5 and 7 should be viewed together, depending on the embodiment of the ordering technique employed.

As indicated above, each data point of source data can contain multi-level information regarding ink drop number. As part of the data expansion of box 72, the print routine 66 maps the multi-level ink drop data into firing data. Therefore, if no ink drops are specified by a source data point, no corresponding ink drops will be present in the firing data. If one ink drop is specified by a source data point, one corresponding ink drop will be present in the firing data. Similarly, if two ink drops are specified by a source data point, two corresponding ink drops will be present in the firing data. Continuing with this approach, if three ink drops are specified by a source data point, three corresponding ink drops will be present in the firing data.

Ink drop placement within the firing data is determined using the final print resolution, the firing data resolution and the actual firing resolution. For instance, in the example described herein, the final print resolution (2,400 dpi horizontal by 1,200 dpi vertical) is higher than the source data resolution (1,200 dpi horizontal by 1,200 dpi vertical). Therefore, ink drop centers for data points with multiple ink drops may be shifted with respect to one another. In the example, the horizontal final print resolution is twice as high as the horizontal source data resolution, thereby allowing each data point to map to at least two printed pixel locations.

The firing data illustrated in FIG. 5 is one example of how the rendered print data can be mapped. In this example, each column of source data is mapped to two columns of firing data. In this example, the odd data points of Col. Y (FIG. 4) map to Col. Ya and Col. Yb (FIG. 5), the even data points of Col. Y+1 map to Col. Y+1a and Col. Y+1b, the odd data points of Col. Y+2 map to Col. Y+2a and Col. Y+2b, the even data points of Col. Y+3 map to Col. Y+3a and Col. Y+3b, and so forth.

In instances where the rendered data specifies one ink drop in a particular data point, the corresponding firing data can include an ink drop located in either of the corresponding firing data columns. The ink drop can be mapped randomly, or according to a fixed routine to one of the corresponding left hand column (e.g., col. Y+Na) or the corresponding right hand column (e.g., col. Y+Nb). For example, the data point at source data location row X, col.

Y+1 can map to firing data location row X, col. Y+1a, but the data point at source data location row X+1, col. Y+3 can map to firing data location row X+1, col. Y+3b. The distribution technique can be selected to assist in generating a quality image with generally balanced ink drop placement and to assist in diffusing mechanical tolerances of the printer 12 and errors resulting from clogged or damaged nozzles 19.

In instances where the source data specifies two ink drops in a particular data point, the corresponding firing data can include an ink drop in both of the corresponding firing data columns. Alternatively, two ink drops can be placed in one firing data location (or pixel).

In instances where the source data specifies three ink drops in a particular data point, the corresponding firing data can include an ink drop in both of the corresponding firing data columns and can include an additional ink drop to be expressed during a subsequent sweep of the print head in a location adjacent or on top of at least one of the prior two ink drops corresponding to that data point of source data. Alternatively, three ink drops can be placed in one firing data location (or pixel). In the example, the source print data contains a three ink drop magenta data value at row X+2, col. Y+3. In the firing data, a magenta ink drop is placed in each of row X+2, col. Y+3a and row X+2, col. Y+3b, and a third ink drop is added to a subsequent sweep of the printhead 18 in the vicinity of row X+2, col. Y+3a.

Once the source data has been expanded in box 72, the print routine 66 continues in box 74 where the firing data is logically masked to derive a first sweep set. In one embodiment (e.g., the embodiment of FIG. 6), the mask is selected according to a fixed routine. In the example, the mask to derive the first sweep set selects the data point corresponding to row X, col. Ya as well as every other data point falling within the actual firing resolution (in the example, 600 dpi horizontal: by 300 dpi vertical). Therefore, from the illustrated portion of firing data, the pixel at row X, col. Y+2a will also be selected to be in the first sweep set and all other illustrated pixels are temporarily ignored. However, the first sweep will include every subsequent fourth firing data pixel in row X (i.e., corresponding to non-illustrated columns Y+4a, Y+6a, etc.). Depending on the position of the printhead (and the nozzles/pens thereon), the first sweep set will similarly include pixels from every forth row (rows X+4, X+8, etc.) in the aforementioned columns.

Thereafter, the pixels selected in box 74 are imaged on the print medium 20 in box 76. More specifically, firing data corresponding to the selected pixels (i.e., the sweep data set, or those pixels surviving application of the mask) are transmitted to the sweep buffer 31. Then, during the next sweep of the printhead 18, the control assembly 28 controls the firing of the nozzles 19 to express ink droplets corresponding to the color and position of the pixels that are selected by the logical mask in box 74.

By printing with an actual firing resolution that is less than the final print resolution, the amount of data transmitted to the sweep buffer 31 per sweep can be relatively small. In the example described herein, a sweep buffer 31 of about 300,000 bytes would be sufficient to buffer the data used to control the printhead 18 for one sweep. In conventional inkjet printers (i.e., when the actual firing resolution is equal or greater than the final print resolution), a larger sweep buffer would be needed. In one example, where the firing data has a resolution of 1,200 dpi by 1,200 dpi, there would be two to four times the amount of firing data per sweep and a sweep buffer of at least 600,000 bytes to possibly greater than 1,200,000 bytes would be needed.

After the printhead 18 completes the sweep, the print routine 66 can continue in box 78 where the print medium 20 can be advanced as is known in the art. The distance that the print medium 20 is advanced will depend on the height of the printhead 18 pens and/or nozzle 19 density. In the example described herein, the print medium 20 can be advanced approximately a sixteenth of the pen height less an underfeed amount. In one embodiment, the underfeed amount can be about $\frac{1}{1,200}$ of an inch. As one skilled in the art will appreciate, other line feed advancement algorithms can be used.

Next, in box 80, the print routine 66 determines if all of the pixels present in the firing data set have been imaged onto the print medium 20. Box 80 can be implemented with a sweep counter that is incremented each time a sweep of the be concluded that enough sweeps have been made such that all of the pixels to be imaged have actually been imaged onto the print medium 20. If all of the pixels have been imaged, the print routine 66 will end.

If, in box 80, there are more pixels of firing data to be imaged, the print routine 66 can continue in box 82 where another mask is logically applied to the firing data to establish the next sweep data set. As indicated above, the pixels can be imaged in a fixed order, can be imaged in a random order, or a combination thereof. Accordingly, the firing data can be masked by a series of masks according to a fixed routine, a random routine or a combination of a fixed and random routine.

In the embodiment of FIG. 6, the firing data is progressively masked according to a fixed routine. In the example, pixels are imaged starting in row X, then row X+3, then row X+2 and then row X+1. This exemplary order assists in coordinating with the exemplary underfeed of about $\frac{1}{1,200}$ of an inch per print medium 20 advancement. In the example, pixels from columns spaced apart by the horizontal firing resolution (e.g., cols. Ya and Y+2a) are imaged before proceeding to another set of columns (e.g., cols. Yb and Y+2b, then Y+1a and Y+3a, and so forth with the exception of extra pixels for the accommodation of data points specifying an ink drop density of greater than two). It is noted that each mask extends to rows and columns extending beyond the illustrated exemplary data set portion. The exact number of rows imaged during a sweep will depend on the pen height and the position of the pen with respect to any unprinted portions of the image.

After the firing data has been logically masked with the next mask in box 82, the print routine 66 returns to box 76 where the masked firing data is transmitted to the sweep buffer 31 as a sweep data set and imaged during the next sweep of the printhead 18. It is noted that the numbers at each pixel in FIGS. 6 and 7 correspond to the temporal correspondence of each pixel with the sweep data set to which the pixel becomes a part after the appropriate number of cycles through the print routine 66.

As indicated, should any source data points specify that more than two ink drops should be imaged, one or more printhead 18 sweeps can be added to the print routine 66 to accommodate the full servicing of those data points (the number of added sweeps depending on the number of such data points and the number of ink drops specified per data point). In the example, a seventeenth sweep can be added for the third magenta ink drop specified by the data point located at row x+2, col. Y+3 (FIG. 4).

In the embodiment of FIG. 7, the pixels are imaged according to a random application of masks. In the illustrated example, there is no specified order to which set of pixels will be part of the sweep data set after a preceding sweep data set. It is noted that in the random routine, ink drops are still masked in accordance with the firing resolution. Therefore, each sweep data set will contain pixels corresponding to regularly spaced intersections of rows and columns. In one embodiment, the application of masks to the firing data set is truly random (e.g., based on a random number generator). In another embodiment, the print routine 66 can be provided with a set of rules when determining which mask to apply to the firing data set. For instance, the masks can be applied according to a dither function, or by shifting a specified number of rows and/or columns from the previously imaged pixel. Again, a sweep or sweeps can be added for any rendered print data point specifying three or more ink drops (the number of added sweeps depending on the number of such data points and the number of ink drops specified per data point). Such randomization assists in diffusing mechanical error of the printer mechanisms contained within the printer 12.

In another embodiment, the fixed order and the random order techniques can be combined. For example, the sequence of rows to be printed can be specified, but the columns can be selected randomly or by a specified sequence. In another arrangement, the sequence of columns to be printed can be specified, but the row can be selected randomly or by a specified sequence.

In the example described herein, the source data has a horizontal resolution that is one half the horizontal final print resolution. Accordingly, the source data is expanded in a horizontal direction. The example allows for a "doubling" of the source data resolution. However, other expansion ratios are possible depending on the respective source data resolution, firing data resolution, actual firing resolution and final print resolution. In the example embodiment, the data points of the source data are logically arranged in rows and columns and the ink drop pixels of the firing data set are arranged in rows and columns such that the source data rows have a one row to one row correspondence with the firing data set rows and the source data columns have a one column to two column correspondence with the firing data set rows. One skilled in the art will appreciate that the print data could similarly be expanded in a vertical direction in addition to or as an alternative to horizontal expansion.

In another example modification, selected rows and/or columns of firing data could be shifted a fraction of a resolution increment. For example, rows X+1 and X+3 could be shifted to the right or left about $\frac{1}{4,800}$ of an inch such that the pixels of rows X+1 and X+3 are horizontally offset from the pixels of row X and row X+2.

The print routine 66, when executed by a device other than the printer 12, allows for distribution of at least part of the processing carried out by a shingler component of the control assembly 28 of a conventional inkjet printer. Accordingly, in the illustrated arrangement, the processing capacity of the printer 12 does not need to be excessive. Also, since less data is contained in each sweep data set of the present invention as opposed to the information used to control each sweep of a convention inkjet printhead 18, the size of the sweep buffer 31 can be relatively small.

In the illustrated embodiment, the printhead 18 is addressed at a horizontal resolution (actual firing resolution) that is less than the horizontal firing data resolution and the horizontal final print resolution. Therefore, the printhead 18 can be moved by the carriage 24 at a higher velocity that is used in conventional printers. It is noted that the carriage velocity should be coordinated with a nozzle 19 density, a nozzle 19 firing frequency and nozzle stagger. In that regard, the print routine 66 can also be used to establish a final print resolution that is greater than a stagger resolution of the pens (i.e., a high resolution image can be obtained from a low resolution inkjet printhead pen). More specifically, by using multiple sweeps of the printhead, the carriage can have a velocity coordinated to the nozzle stagger and the firing data can have a higher resolution than the pen stagger, but where the firing data can be accurately reproduced as the printed image (it is noted that the highest final print resolution in a conventional inkjet printer is dictated by the nozzle stagger where the nozzles are driven as if arranged in a matrix, but are fired sequentially to account for movement of the printhead over the print-zone).

In addition, multiple sweeps of the printhead 18 are used to expand and distribute ink droplet centroids corresponding to multi-level source data points. Therefore, the final print resolution following imaging using the print routine 66 can be higher than the source data resolution.

The figures show the architecture, functionality, and operation of an implementation of the print under data resolution routine 66. If embodied in software, each illustrated block may represent a module, segment, or portion of code that comprises program instructions to implement the specified logical function(s). The program instructions may be embodied in the form of source code that comprises human readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s).

Although the print under data resolution routine 66 illustrates a specific order of execution, it is understood that the order of execution may differ from that which is depicted. For example, the order of execution of two or more blocks may be changed relative to the order shown. Also, two or more blocks shown in succession may be executed concurrently or with partial concurrence. In addition, any number of counters, state variables, warning semaphores, or messages might be added to the logical flow described herein, for purposes of enhanced utility, accounting, performance measurement, or providing troubleshooting aids, and the like. It is understood that all such variations are within the scope of the present invention.

Also, where the print under data resolution routine 66 comprises software or code, the print under data resolution routine 66 can be embodied in any computer readable medium for use by or in connection with an instruction execution system such as, for example, a processor in a computer system or other system. In this sense, the logic may comprise, for example, statements including instructions or declarations that can be fetched from the computer-readable medium and executed by the instruction logic system. In the context of the present invention, a "computer-readable medium" can be any medium that can contain, store or maintain the logic described herein for use by or in connection with the instruction execution system. A computer-readable medium can comprise any one of many physical media such as, for example, electronic, magnetic, optical, electromagnetic, or semiconductor media. More specific examples of suitable computer-readable medium will include, but are not limited to, magnetic tapes, magnetic floppy diskettes, magnetic hard drives, or compact disks. Also, the computer-readable medium can be random access memory (RAM) including, for example, static random access memory (SRAM), dynamic random access memory (DRAM), and/or magnetic random access memory (MRAM). In addition, the computer-readable medium can be a read-only memory (ROM), a programmable read-only memory (PROM), an erasable programmable read-only memory (EPROM), an electronically erasable programmable read-only memory (EEPROM), and/or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method of preparing source print data corresponding to a pattern to be imaged on a print medium, the source data having a source data resolution of data points in a horizontal direction and a vertical direction, comprising:

setting a final print resolution in the horizontal direction and the vertical direction;

setting an actual nozzle firing resolution for each sweep of an inkjet printhead in the horizontal direction and the vertical direction, the actual firing resolution being lower than the final print resolution in the horizontal direction and the vertical direction than;

expanding each source data point into one or more pixels of firing data to produce a firing data set having a firing data resolution the same as the final print resolution; and successively masking the firing data set at the actual firing resolution to generate a series of sweep data sets, each sweep data set containing firing data for an individual sweep of the inkjet printhead.

2. The method of claim 1, wherein the final print resolution is greater than the source data resolution in at least one of the horizontal direction and the vertical direction.

3. The method of claim 1, wherein the successive masking selects firing data pixels corresponding to a selected set of rows and at least one odd column of source data before selecting firing data pixels corresponding to the selected set of rows and at least one even column of source data.

4. The method of claim 1, wherein the successive masking selects firing data pixels from the firing data set according to a random routine.

5. The method of claim 4, wherein the random routine includes a dither function.

6. The method of claim 1, wherein the successive masking selects firing data pixels according to a predetermined order of rows of firing data pixels and randomly with respect to columns of firing data pixels.

7. The method of claim 1, further comprising adding at least one sweep data set for a source data point specifying an ink drop number that exceeds a printhead capacity of expressing the specified number of ink drops under the actual firing resolution in a number of printhead sweeps equaling the firing data resolution divided by the actual firing resolution.

8. The method of claim 1, wherein the source data points are logically arranged in rows and columns and the firing data pixels are arranged in rows and columns, and the source data rows have a one row to one row correspondence with the firing data set rows.

9. The method of claim 8, wherein the firing data set has twice as many columns as the source data, and the source data columns have a one column to two column correspondence with the firing data set columns.

10. The method of claim 9, wherein the source data contains multi-level data such that each data point contains an indication of ink drop number and the expanding includes mapping each multi-level data point to at least a corresponding pair of firing data pixels.

11. The method of claim 10, wherein the successive masking selects firing data pixels corresponding to a selected set of rows and at least one odd column of source data before selecting firing data pixels corresponding to the selected set of rows and at least one even column of source data.

12. The method of claim 10, wherein the successive masking selects firing data pixels from the firing data set according to a random routine.

13. The method of claim 10, wherein the successive masking selects firing data pixels according to a predetermined order of rows of firing data pixels and randomly with respect to columns of firing data pixels.

14. The method of claim 10, further comprising adding at least one sweep data set for a source data point specifying an ink drop number that exceeds a printhead capacity of expressing the specified number of ink drops under the actual firing resolution in a number of printhead sweeps equaling the firing data resolution divided by the actual firing resolution.

15. The method of claim 1, wherein the source data contains multi-level data such that each data point contains an indication of ink drop number and the expanding includes mapping each data point to at least two firing data pixels to distribute the ink drops specified by the multi-level data and such that the final print resolution is higher than the source data resolution.

16. The method of claim 1, further comprising transmitting each sweep data set to a sweep buffer of an inkjet printer.

17. The method of claim 1, wherein the method is carried out by a host device separate from a printer that includes the printhead.

18. The method of claim 1, wherein the method is carried out by a printer that includes the printhead.

19. The method of claim 1, wherein the final print resolution is higher than a nozzle stagger resolution of the printhead.

20. A program embodied in computer readable medium to prepare source print data corresponding to a pattern to be imaged on a print medium, the source data having a source data resolution of data points in a horizontal direction and a vertical direction, comprising:

code that sets a final print resolution in the horizontal direction and the vertical direction;

code that sets an actual nozzle firing resolution for each sweep of an inkjet printhead in the horizontal direction and the vertical direction, the actual firing resolution being lower than the final print resolution in the horizontal direction and the vertical direction;

code that expands each source data point into one or more pixels of firing data to produce a firing data set having a firing data resolution the same as the final print resolution; and code that successively masks the firing data set at the actual firing resolution to generate a series of sweep data sets, each sweep data set containing firing data for an individual sweep of the inkjet printhead.

21. The program embodied in computer readable medium of claim 20, wherein the final print resolution is greater than the source data resolution in at least one of the horizontal direction and the vertical direction.

22. The program embodied in computer readable medium of claim 20, wherein the code to successively mask masks by one of selecting firing data pixels corresponding to a selected set of rows and at least one odd column of source data before selecting firing data pixels corresponding to the selected set of rows and at least one even column of source data, selecting firing data pixels from the firing data set according to a random routine, selecting firing data pixels according to a predetermined order of rows of firing data pixels and randomly with respect to columns of firing data pixels, and combinations thereof.

23. The program embodied in computer readable medium of claim 20, further comprising code to add at least one sweep data set for a source data point specifying an ink drop number that exceeds a printhead capacity of expressing the specified number of ink drops under the actual firing resolution in a number of printhead sweeps equaling the firing data resolution divided by the actual firing resolution.

24. The program embodied in computer readable medium of claim 20, wherein:
the data points of the source data are logically arranged in rows and columns and the firing data pixels are arranged in rows and columns, and the source data rows have a one row to one row correspondence with the firing data set rows;
the firing data set has twice as many columns as the source data, and the source data columns have a one column to two column correspondence with the firing data set columns;
the source data contains multi-level data such that each data point contains an indication of ink drop number; and
the code to expand maps each multi-level data point to at least a corresponding pair of firing data pixels.

25. The program embodied in computer readable medium of claim 20, wherein the source data contains multi-level data such that each data point contains an indication of ink drop number and the code to expand maps each data point to at least two firing data pixels to distribute the ink drops specified by the multi-level data and such that the final print resolution is higher than the source data resolution.

26. The program embodied in computer readable medium of claim 20, further comprising code to transmit each sweep data set to a sweep buffer of an inkjet printer.

27. A printer system that prepares source print data corresponding to a pattern to be imaged on a print medium, the source data having a source data resolution of data points in a horizontal direction and a vertical direction, comprising:
means for setting a final print resolution in the horizontal direction and the vertical direction;
means for setting an actual nozzle firing resolution for each sweep of an inkjet printhead in the horizontal direction and the vertical direction, the actual firing resolution being lower than the final print resolution in the horizontal direction and the vertical direction;
means for expanding each source data point into one or more pixels of firing data to produce a firing data set having a firing data resolution the same as the final print resolution; and
means for successively masking the firing data set at the actual firing resolution to generate a series of sweep data sets, each sweep data set containing firing data for an individual sweep of the inkjet printhead.

28. The printer system of claim 27, wherein the final print resolution is greater than the source data resolution in at least one of the horizontal direction and the vertical direction.

29. The printer system of claim 27, wherein the means for successively masking masks by one of selecting firing data pixels corresponding to a selected set of rows and at least one odd column of source data before selecting firing data pixels corresponding to the selected set of rows and at least one even column of source data, selecting firing data pixels from the firing data set according to a random routine, selecting firing data pixels according to a predetermined order of rows of firing data pixels and randomly with respect to columns of firing data pixels, and combinations thereof.

30. The printer system of claim 27, further comprising means for adding at least one sweep data set for a source data point specifying an ink drop number that exceeds a printhead capacity of expressing the specified number of ink drops under the actual firing resolution in a number of printhead sweeps equaling the firing data resolution divided by the actual firing resolution.

31. The printer system of claim 27, wherein:
the data points of the source data are logically arranged in rows and columns and the firing data pixels are arranged in rows and columns, and the source data rows have a one row to one row correspondence with the firing data set rows;
the firing data set has twice as many columns as the source data, and the source data columns have a one column to two column correspondence with the firing data set columns;
the source data contains multi-level data such that each data point contains an indication of ink drop number; and
the means to expand maps each multi-level data point to at least a corresponding pair of firing data pixels.

32. The printer system of claim 27, wherein the source data contains multi-level data such that each data point contains an indication of ink drop number and the means for expanding maps each data point to at least two firing data pixels to distribute the ink drops specified by the multi-level data and such that the final print resolution is higher than the source data resolution.

33. The printer system of claim 27, further comprising means to transmit each sweep data set to a sweep buffer of an inkjet printer.

34. The printer system of claim 27, wherein the means for setting the final print resolution, the means for setting the actual nozzle firing resolution, the means for expanding and the means for successively masking are part of a general computing device.

35. The printer system of claim 27, wherein the means for setting the final print resolution, the means for setting the actual nozzle firing resolution, the means for expanding and the means for successively masking are part of a printer that images a pattern corresponding to the print data on the print medium.

36. An inkjet printer system, comprising:
a printhead for imaging a pattern on a print medium during successive sweeps over the print medium using a plurality of inkjet nozzles; and
a control assembly for controlling the firing of the nozzles of the printhead, the firing of the nozzles for each sweep of the printhead controlled in accordance with a corresponding sweep data set, each sweep data set containing pixelized firing data having an actual firing resolution that is less than a final print resolution of the pattern, each sweep data set generated by expanding each of a plurality of data points from a set of source data corresponding to the pattern into one or more firing data pixels to produce a firing data set and masking the firing data set at the actual firing resolution.

37. The printer system of claim 36, further comprising a sweep buffer for buffering the sweep data set.

38. The printer system of claim 36, wherein a final print resolution is greater than the source data resolution in at least one of a horizontal direction and a vertical direction.

39. The printer system of claim 36, wherein the sweep data sets are successively generated according to a fixed routine.

40. The printer system of claim 36, wherein the sweep data sets are successively generated according to a random routine.

41. The printer system of claim 36, wherein the printhead is controlled by the control assembly to carry out at least one additional sweep for a source data point specifying an ink drop number that exceeds a printhead capacity of expressing the specified number of ink drops under the actual firing resolution in a number of printhead sweeps equaling a firing data resolution divided by the actual firing resolution.

42. The printer system of claim 36, wherein:

the source data points are logically arranged in rows and columns and the firing data pixels are arranged in rows and columns, and the source data rows have a one row to one row correspondence with the firing data set rows;

the firing data set has twice as many columns as the source data, and the source data columns have a one column to two column correspondence with the firing data set columns;

the source data contains multi-level data such that each data point contains an indication of ink drop number; and each multi-level data point is mapped to at least a corresponding pair of firing data pixels.

43. The printer system of claim 36, wherein the source data contains multi-level data such that each data point contains an indication of ink drop number and each data point is mapped to at least two firing data pixels to distribute the ink drops specified by the multi-level data and such that the final print resolution is higher than the source data resolution.

\* \* \* \* \*